United States Patent
Ha et al.

(10) Patent No.: US 10,614,583 B2
(45) Date of Patent: Apr. 7, 2020

(54) IMAGE PROCESSING APPARATUS AND METHOD

(71) Applicant: SAMSUNG ELECTRONICS CO., LTD., Suwon-si (KR)

(72) Inventors: Inwoo Ha, Seongnam-si (KR); Hyong Euk Lee, Incheon (KR); Young Hun Sung, Hwaseong-si (KR); Minsu Ahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 15/494,014

(22) Filed: Apr. 21, 2017

(65) Prior Publication Data
US 2018/0122090 A1 May 3, 2018

(30) Foreign Application Priority Data
Oct. 31, 2016 (KR) .................. 10-2016-0143365

(51) Int. Cl.
| | |
|---|---|
| *G06T 7/507* | (2017.01) |
| *G06T 15/50* | (2011.01) |
| *G06T 7/11* | (2017.01) |
| *G06K 9/46* | (2006.01) |

(52) U.S. Cl.
CPC .......... *G06T 7/507* (2017.01); *G06K 9/4661* (2013.01); *G06T 7/11* (2017.01); *G06T 15/50* (2013.01); *G06T 15/506* (2013.01); *G06T 2207/10024* (2013.01); *G06T 2207/10028* (2013.01); *G06T 2207/20021* (2013.01)

(58) Field of Classification Search
CPC . G06T 7/507; G06T 15/50; G06T 7/11; G06T 15/506; G06T 2207/10024; G06T 2207/10028; G06T 2207/20021; G06K 9/4661
See application file for complete search history.

(56) References Cited

U.S. PATENT DOCUMENTS

| | | | |
|---|---|---|---|
| 7,860,306 B2 | 12/2010 | Mallick et al. | |
| 8,284,194 B2 * | 10/2012 | Zhang | G06T 7/521 345/420 |
| 8,457,389 B2 | 6/2013 | Ishiyama | |
| 8,705,855 B2 | 4/2014 | Tsukada | |
| 8,923,575 B2 | 12/2014 | Tsukada | |
| 9,330,500 B2 | 5/2016 | Karsch et al. | |
| 2014/0085625 A1 * | 3/2014 | Ahmed | G06K 9/00362 356/73 |
| 2014/0176549 A1 * | 6/2014 | Uralsky | G06T 15/005 345/426 |
| 2015/0138386 A1 | 5/2015 | Yano et al. | |
| 2015/0193973 A1 * | 7/2015 | Langguth | G06T 7/586 345/420 |
| 2015/0262413 A1 | 9/2015 | Baker et al. | |
(Continued)

FOREIGN PATENT DOCUMENTS

KR 10-1502143 B1 3/2015

*Primary Examiner* — Wesley J Tucker
(74) *Attorney, Agent, or Firm* — NSIP Law

(57) ABSTRACT

An image processing apparatus includes a first processor configured to obtain, from a color image, an illumination element image and an albedo element image corresponding to the color image, and a second processor configured to divide the illumination element image into a plurality of subelement images each corresponding to the color image.

20 Claims, 4 Drawing Sheets

(56) References Cited

U.S. PATENT DOCUMENTS

2015/0327766 A1   11/2015   Gupta et al.
2015/0356769 A1   12/2015   Imber et al.
2017/0035268 A1*  2/2017   Kumar ................. H04N 13/261
2018/0232899 A1*  8/2018   Lansel .................... G06T 7/586
2018/0293745 A1* 10/2018   Ha .......................... G06T 5/002

* cited by examiner

IMAGE PROCESSING APPARATUS AND METHOD

CROSS-REFERENCE TO RELATED APPLICATIONS

This application claims the benefit under 35 USC § 119(a) of Korean Patent Application No. 10-2016-0143365 filed on Oct. 31, 2016, in the Korean Intellectual Property Office, the entire disclosure of which is incorporated herein by reference for all purposes.

BACKGROUND

1. Field

The following description relates to an image processing apparatus and method for dividing an illumination element included in a color image into a plurality of subelements.

2. Description of Related Art

Removing and dividing an albedo element from a color image is used to extract illumination information through intrinsic decomposition from the color image.

Removing an albedo element from a color image is also used to obtain a shading element image. The shading element image includes a plurality of undivided elements, for example, a shadow element, a highlight element, and a specular element, indicating similar features in a color space.

However, when a three-dimensional (3D) image is rendered using a related shading element image including a plurality of elements, a geometric edge may be present on a portion of a shadow boundary. The shadow element may be used to estimate a position of the light source, but it is difficult to use the shading element.

Thus, an image processing apparatus and method may be needed to effectively divide a color image into a plurality of subelement images associated with various elements used for rendering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system includes an image processing apparatus including a first processor configured to obtain, from a color image, an illumination element image and an albedo element image corresponding to the color image, and a second processor configured to divide the illumination element image into subelement images each corresponding to the color image.

The image processing apparatus may further include a memory configured to store instructions. The first processor may be further configured to execute the instructions to obtain, from the color image, the illumination element image and the albedo element image corresponding to the color image. The second processor may be further configured to execute the instructions to divide the illumination element image into the subelement images each corresponding to the color image.

The second processor may be configured to divide the illumination element image into the subelement images using a depth image corresponding to the color image. The second processor may be configured to calculate a normal vector corresponding to each pixel in at least one area of the color image using the depth image and to divide the illumination element image into the subelement images based on a normal vector change rate between neighboring pixels in the at least one area.

The second processor may be configured to divide the illumination element image into the subelement images based on a result of comparing an illumination element change rate between the neighboring pixels to the normal vector change rate between the neighboring pixels.

The second processor may be configured to divide an illumination element change between the neighboring pixels into a shading element and a shadow element based on a degree of correlation between the illumination element change rate between the neighboring pixels and the normal vector change rate between the neighboring pixels.

The second processor may be configured to calculate a spherical harmonic function indicating a corresponding relationship between the normal vector and a shading element from an illumination element change between the neighboring pixels, and to divide the illumination element change between the neighboring pixels into the shading element and a shadow element based on a degree of correlation between the illumination element change and the spherical harmonic function.

The subelement images may include any one or combination of a shading element image, a shadow element image, a highlight element image, and a specular element image.

The image processing apparatus may further include a third processor configured to estimate a direction of light or a position of at least one light source of the color image using the shadow element image.

The image processing apparatus may further include a fourth processor configured to refine a depth image corresponding to the color image using the shading element image.

In another general aspect, a system includes an image processing apparatus including a first processor configured to obtain, from a color image, an illumination element image and an albedo element image corresponding to the color image, and a second processor configured to calculate a normal vector corresponding to each pixel of the illumination element image using a depth image corresponding to the color image, cluster the illumination element image to at least one pixel group based on a normal vector change rate between neighboring pixels in the illumination element image, and to divide the illumination element image into subelement images based on a result of comparing an illumination element change rate between neighboring pixels in the at least one pixel group to a normal vector change rate of the pixel group.

The image processing apparatus may further include a memory configured to store instructions. The first processor may be further configured to execute the instructions to obtain, from the color image, the illumination element image and the albedo element image corresponding to the color image. The second processor may be further configured to execute the instructions to calculate the normal vector corresponding to each pixel of the illumination element image using the depth image corresponding to the color image, cluster the illumination element image to at least one pixel group based on the normal vector change rate between neighboring pixels in the illumination element image, and to divide the illumination element image into subelement images based on the result of comparing the illumination element change rate between neighboring pixels in the at least one pixel group to the normal vector change rate of the pixel group.

The second processor may be configured to divide an illumination element change into a shading element and a shadow element based on a degree of correlation between the illumination element change rate between the neighboring pixels and the normal vector change rate of the pixel group.

The second processor may be configured to calculate a spherical harmonic function indicating a corresponding relationship between the normal vector and a shading element from an illumination element change between the neighboring pixels and to divide the illumination element change between the neighboring pixels into the shading element and a shadow element based on a degree of correlation between the illumination element change and the spherical harmonic function.

The subelement images may include any one or combination of a shading element image, a shadow element image, a highlight element image, and a specular element image.

In still another general aspect, a system includes an image processing method including obtaining, from a color image, an illumination element image and an albedo element image corresponding to the color image, and dividing the illumination element image into a plurality of subelement images each corresponding to the color image.

The dividing of the illumination element image may include calculating a normal vector corresponding to each pixel in at least one area of the color image using a depth image corresponding to the color image, and dividing the illumination element image into the subelement images based on a normal vector change rate between neighboring pixels in the at least one area.

The dividing of the illumination element image may include dividing an illumination element change between the neighboring pixels into a shading element and a shadow element based on a degree of correlation between an illumination element change rate between the neighboring pixels and the normal vector change rate between the neighboring pixels.

The dividing of the illumination element image may include calculating a spherical harmonic function indicating a corresponding relationship between the normal vector and a shading element from an illumination element change between the neighboring pixels, and dividing the illumination element change between the neighboring pixels into the shading element and a shadow element based on a degree of correlation between the illumination element change and the spherical harmonic function.

Other features and aspects will be apparent from the following detailed description, the drawings, and the claims.

Figure 1:
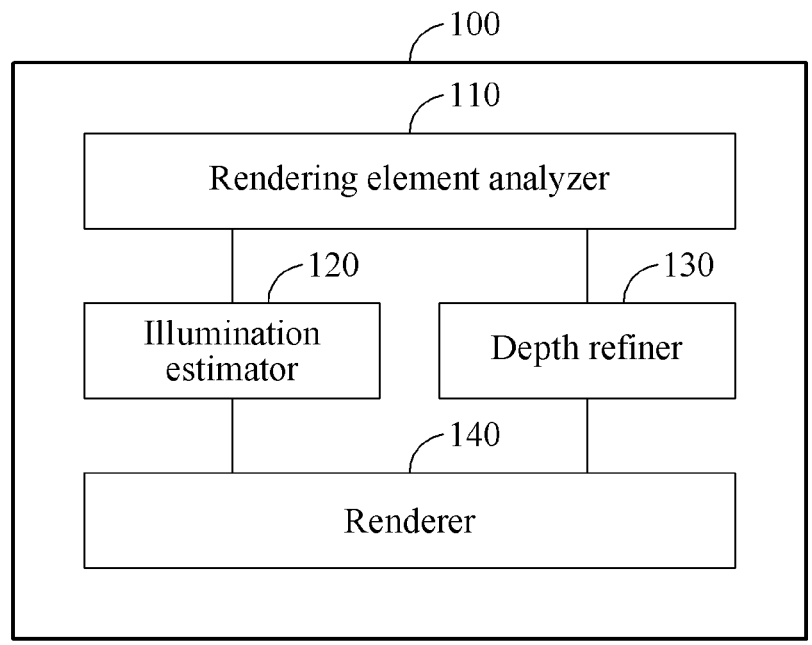
FIG. 1 is a partial block diagram illustrating an example of an image processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

FIG. 1 is a partial block diagram illustrating an example of an image processing apparatus. The image processing apparatus includes an image receiver (not shown) and an image processor 100. The image processor 100 includes a rendering element analyzer 110, an illumination estimator 120, a depth refiner 130, and a renderer 140.

The image receiver receives data required for processing an image. For example, the image receiver receives a color image and/or a depth image corresponding to the color image. The image receiver includes at least one processor and at least one hardware component required for receiving and transmitting the data.

The rendering element analyzer 110 divides the color image into subelement images including various elements to be used for rendering. For example, an illumination element image from which an albedo element is excluded from the color image and an albedo element image are obtained by dividing the color image. Also, the illumination element image may be divided into the subelement images. The rendering element analyzer 110 may be implemented by at least one processor. For example, the rendering element analyzer 110 includes a first processor and a second processor.

The rendering element analyzer 110 may use a feature in a color space to obtain the albedo element image and the illumination element image by dividing the color image. As a non-limited example, in response to a change in color of neighboring pixels in the color image having a relatively high frequency change feature in the color space, the rendering element analyzer 110 may identify the change as an intrinsic color change of an object which is unrelated to an illumination and determine the change as an albedo element. In response to the change in the colors of the neighboring pixels in the color image having a relatively low frequency change feature in the color space, the rendering element analyzer 110 may identify the change as a color change caused by an illumination effect and determine the change as an illumination element. Based on the aforementioned method, the rendering element analyzer 110 may obtain the albedo element image and the illumination element image by dividing the color image.

The illumination element image from which albedo element is excluded may include a plurality of undivided elements indicating similar features in the color space. For example, the illumination element image includes a shading element, a shadow element, a highlight element, and a specular element. The rendering element analyzer 110 may separate the elements and obtain the subelement images. For example, the rendering element analyzer 110 divides the illumination element image into a shading element image, a shadow element image, a highlight element image, and a specular element image.

Generally, the shading element corresponds to a result obtained by a surface geometry and the shadow element corresponds to a result obtained when light is blocked by another neighboring object. The highlight element is an opposite concept of the shadow element and indicates that a pixel of the object is relatively bright compared to a neighboring pixel regardless of the surface geometry. The specular element indicates an influence caused based on a relative position and a relative direction of a viewpoint and the illumination. That is, the shading element is dependent on a change of a normal vector of a surface, but the shadow element, the highlight element, and the specular element are substantially unrelated to the change of the normal vector.

Thus, the rendering element analyzer 110 may use the normal vector corresponding to each pixel in the illumination element image to extract the shading element image from the illumination element image. As a non-limited example, the rendering element analyzer 110 calculates the normal vector corresponding to each pixel using the depth image received by the image receiver and extracts the shading element image from the illumination element image based on a result of comparing an illumination element change rate between the neighboring pixels to a normal vector change rate between the neighboring pixels.

For example, in response to an object having a curved surface forming a shadow, a change rate may be greater than the illumination element change rate due to the curved surface. Based on such a feature, the illumination element change rate may be compared to the normal vector change rate such that the illumination element change is not identified as the shading element on the curved surface. Based on the comparison result, the illumination element change occurring during an interval during which the illumination element change rate is relatively great may be verified to be the shadow element.

In an example, the rendering element analyzer 110 may verify whether the illumination element change between the neighboring pixels is the shading element based on the illumination element change rate between the neighboring pixels and the normal vector change rate between the neighboring pixels. For example, when a similarity between the illumination element change rate between the neighboring pixels and the normal vector change rate between the neighboring pixels is detected such that a degree of correlation between the illumination element change rate and the normal vector change rate is determined to be relatively high, the rendering element analyzer 110 identifies that the corresponding illumination element change is caused by a surface geometry such that the corresponding illumination element change is determined to be the shading element.

In another example, when the similarity between the illumination element change rate between the neighboring pixels and the normal vector change rate between the neighboring pixels is undetected such that the degree of correlation between the illumination element change rate and the normal vector change rate is determined to be relatively low, the rendering element analyzer 110 identifies that the corresponding illumination element change is not caused by the surface geometry such that the corresponding illumination element change is determined to be the shadow element.

Also, the rendering element analyzer 110 may use a spherical harmonic function indicating a corresponding relationship between a normal vector and the shading element to extract a shading element image from the illumination element image. For example, based on a feature that neighboring pixels have similar shading elements when the neighboring pixels in an image have similar normal vector values, a histogram of a shading element value is generated for each normal vector for at least one area in the image or the spherical harmonic function is calculated by analyzing the shading element value corresponding to each normal vector. In response to the spherical harmonic function being calculated, the corresponding illumination element change may be determined to be the shadow element in response to a degree of correlation between the illumination element change and the spherical harmonic function being relatively low, that is, the illumination element change being beyond a range of the spherical harmonic function.

The rendering element analyzer 110 may detect a brighter area regardless of the normal vector change rate between the neighboring pixels to extract a highlight element image from the illumination element image. The rendering element analyzer 110 may detect an area in which a ratio between the illumination element change rate and the normal vector change rate is rapidly increased or decreased in order to detect a specular element image from the illumination element image. Here, a difference between a position of a left image and a position of a right image or a difference between positions of temporally different frames may be used to divide and extract the specular element.

In an example, the rendering element analyzer 110 may detect an area in which a ratio between an albedo element change rate and the normal vector change rate is rapidly increased or decreased in order to extract a reflection/refraction element image from an albedo element image.

In another example, the rendering element analyzer 110 clusters the illumination element image to at least one pixel group based on the normal vector change rate between the neighboring pixels in the illumination element image, and divides the illumination element image into a plurality of subelement images based on a result of comparing an illumination element change rate between neighboring pixels in the pixel group to a normal vector change rate of the pixel group.

The illumination estimator 120 estimates a direction of light or a position of at least one light source of the color image using the shadow element image obtained by the rendering element analyzer 110. The illumination estimator 120 may analyze an effect of an illumination based on the position of the light source estimated for each pixel in at least one area. The illumination estimator 120 may be implemented by at least one processor and include, for example, a third processor.

The depth refiner 130 refines the depth image corresponding to the color image using the shading element image obtained by the rendering element analyzer 110. The depth refiner 130 may be implemented by at least one processor and include, for example, a fourth processor.

The renderer 130 may perform rendering based on the effect of the illumination, the position of the light source estimated by the illumination estimator 120, and the depth image refined by the depth refiner 130. The rendering performed by the renderer 140 may be performed iteratively to render consecutive images. The renderer 140 may be implemented by at least one processor.

Figure 2:
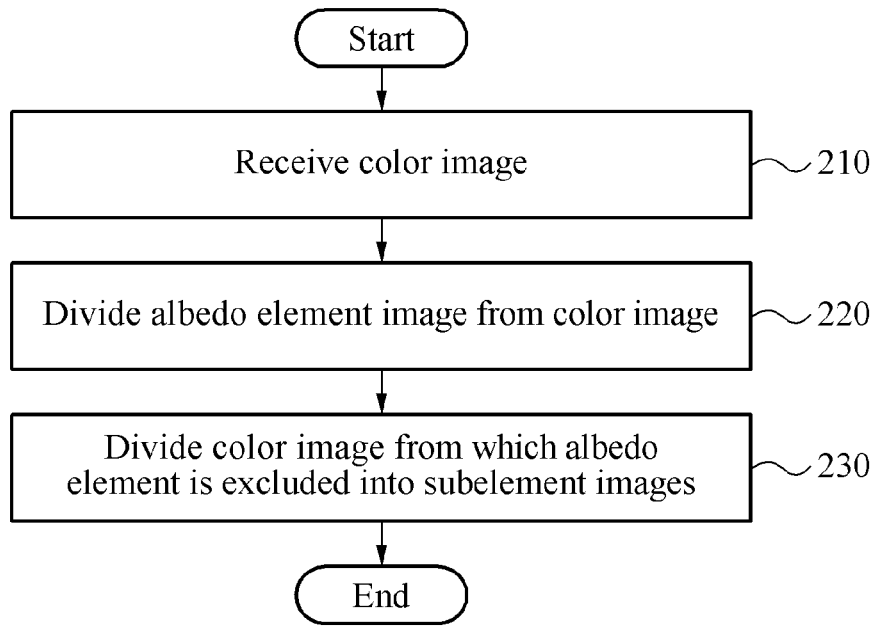
FIG. 2 is a flowchart illustrating an example of an image processing method.

FIG. 2 is a flowchart illustrating an example of an image processing method. The image processing method of FIG. 2 may be performed by the image processor 100 of FIG. 1.

In operation 210, an image processor receives at least one color image as an input. One color image may be used for analyzing the color image based on each element, but a left image and a right image may be used for, for example, an identical scene, in order to enhance an accuracy of the analyzing.

In operation 220, the image processor obtains an albedo element image and the illumination element image by dividing the albedo element image and the illumination element image from the color image. For example, the image processor divides an albedo element from an illumination element using a feature of a frequency change in a color space for a color change between neighboring pixels in the color image.

In operation 230, the image processor obtains a plurality of subelement images by dividing the color image from which the albedo element is excluded, that is, the illumination element image, into the subelement images. For example, the illumination element image is divided into a shading element image, a shadow element image, a highlight element image, and a specular element image.

Based on the proposed image processing method, the subelement images may be obtained by additionally decomposing the illumination element image from which the albedo element is excluded from the color image. Because a related intrinsic decomposing method focuses on dividing or removing the albedo element from the color image, various subelements are present in an illumination element (or a shading element). However, the proposed image processing method may obtain individual subelement images by separating each of the subelements.

Figure 3:
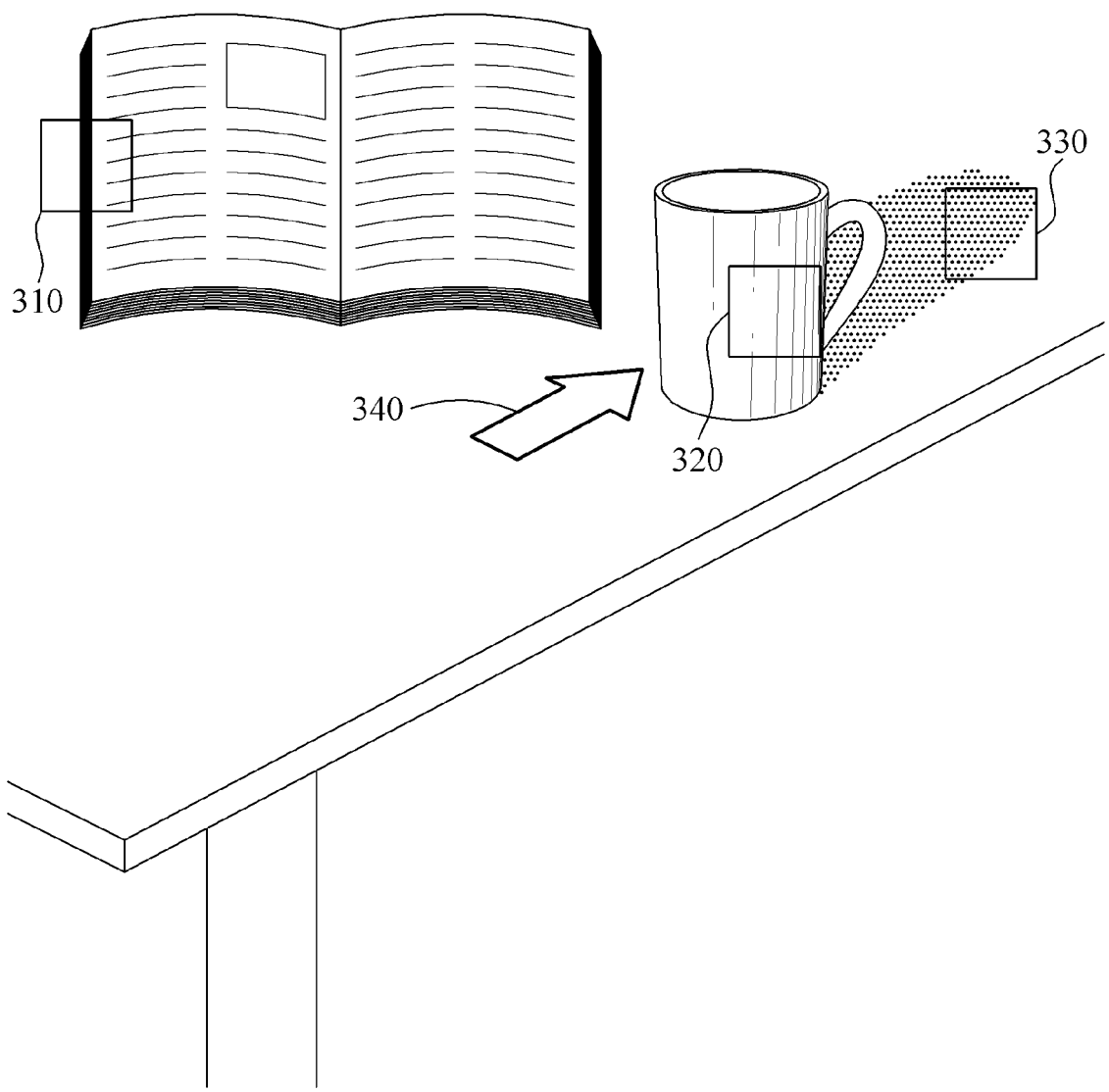
FIG. 3 illustrates an example of various color elements included in a color image.

FIG. 3 illustrates an example of various color elements included in a color image. An albedo element, a shading element, and a shadow element are representative color elements.

The albedo element is a feature that determines a reflectivity of light. The albedo element may vary based on a material of an object, a color of a surface, and a wavelength of light. Referring to a first area 310 of FIG. 3, a material difference and a color difference are present between a surface of a table and a surface of a book such that a color value may be changed based on differences in albedo elements between neighboring pixels in the first area 310. Generally, the albedo element indicates a relatively high frequency change feature in a color space.

The shading element is a feature represented based on a surface geometry of an object or a background. Referring to a second area 320 of FIG. 3, the color value may be changed based on differences in shading elements based on a predetermined change rate in the second area 320 because a surface of a cup is curved. Generally, the shading element indicates a relatively low frequency change feature in the color space.

The shadow element is a feature occurring in an area in which a light is blocked by another neighboring object. Referring to a third area 330 of FIG. 3, because a shadow of the cup is present on the surface of the table, the color value may be changed based on differences in shadow elements between neighboring pixels in the third area 330. Generally, the shadow element indicates the relatively low frequency change feature in the color space.

In response to the shadow element being divided and extracted from other color elements, a direction 340 of light or a position of a light source may be estimated based on the extracted shadow element. Because the shading element is not generally used for estimating the direction 340 of light or the position of the light source, the accuracy of estimating the direction 340 of light and the position of the light source may be enhanced in response to the shadow element being additionally divided from an illumination element image.

Figure 4:
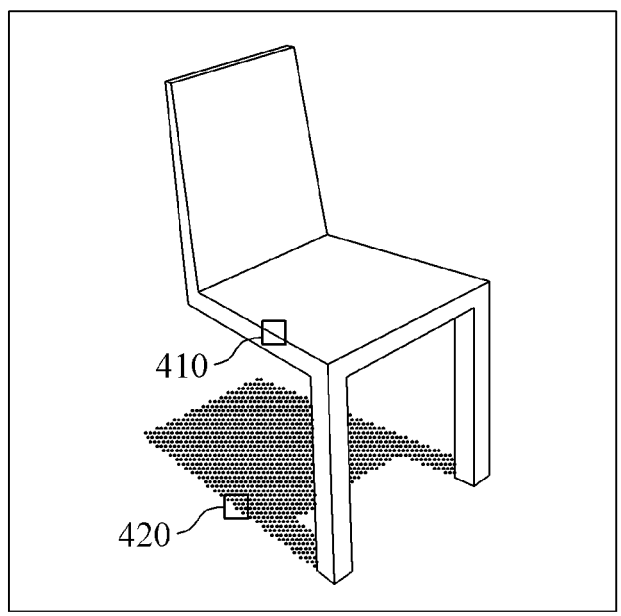
FIG. 4 illustrates another example of various color elements included in a color image.

FIG. 4 illustrates another example of various color elements included in a color image. Because a frequency change feature of an albedo element is different from that of a shading element and that of a shadow element in a color space, the albedo element may be divided from the color image based on a difference in frequency change features. However, the shading element and the shadow element may not be divided from the color image based on a frequency change feature because the shading element and the shadow element have similar frequency change features in the color space.

To divide the shading element and the shadow element from the color image, the shading element is used because the shading element is dependent on a change of a normal vector of a surface and the shadow element is used because the shadow element is substantially irrelevant to the change of the normal vector of the surface.

For example, referring to a first area 410 of FIG. 4, a rapid change of a normal vector between neighboring pixels may be detected in a neighborhood of a chair from which an illumination element change is detected. In this example, the illumination element change is identified as the shading element. Referring to a second area 420 of FIG. 4, neighboring pixels on a boundary of a shadow from which the illumination element change is detected have similar normal vector values. In this example, the illumination element change is identified as the shadow element.

Thus, the illumination element change between the neighboring pixels may be divided into the shading element and the shadow element based on a degree of correlation between the illumination element change rate between the neighboring pixels and a normal vector change rate between the neighboring pixels.

Figure 5:
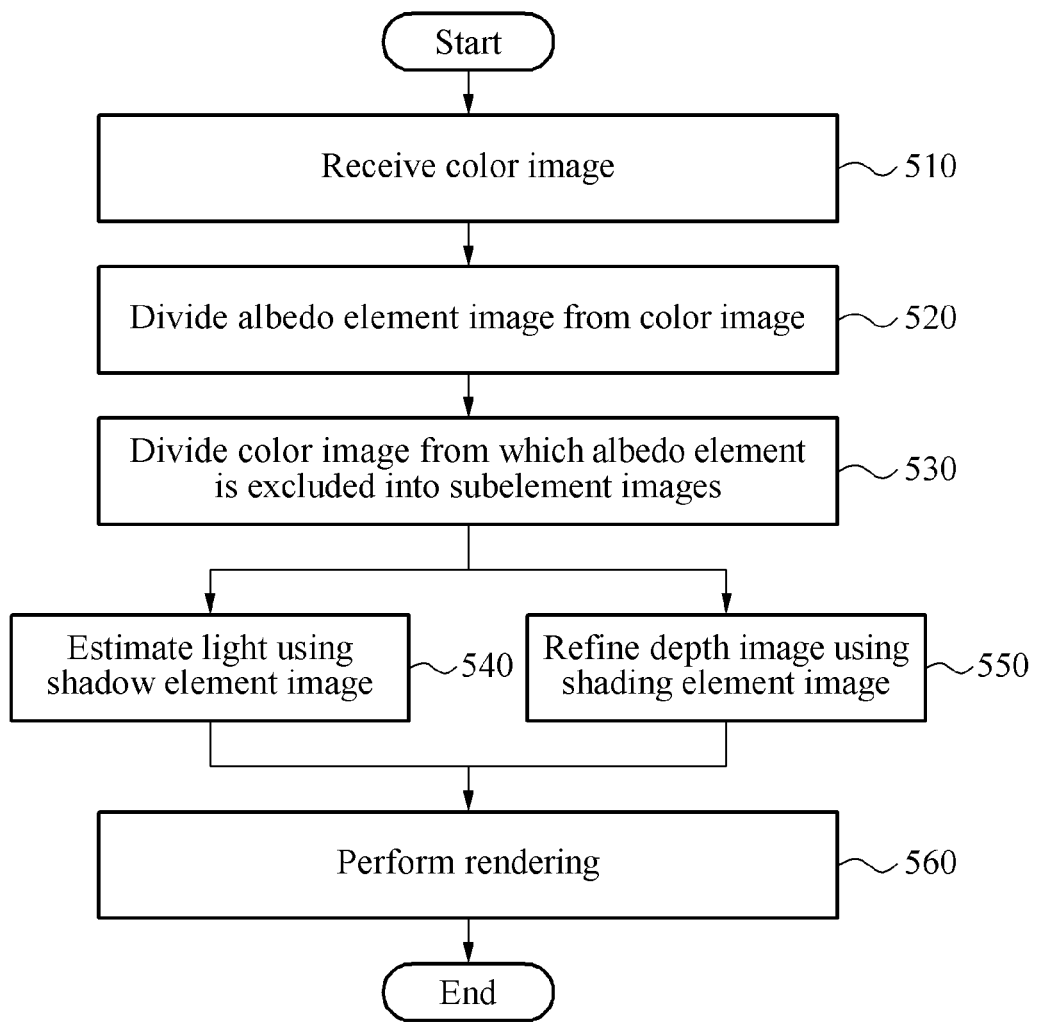
FIG. 5 is a flowchart illustrating another example of an image processing method.

FIG. 5 is a flowchart illustrating another example of an image processing method. The image processing method of FIG. 5 may be performed by the image processor 100 of FIG. 1.

In operation 510, an image processor receives at least one color image as an input. One color image may be used for analyzing the color image based on each element, but a left image and a right image may be used for, for example, an identical scene, in order to enhance an accuracy.

In operation 520, the image processor obtains an albedo element image and an illumination element image by dividing the albedo element image and the illumination element image from the color image. For example, the image processor divides an albedo element from an illumination element using a frequency change feature in a color space for a color change between neighboring pixels in the color image.

In operation 530, the image processor obtains a plurality of subelement images by dividing the color image from which the albedo element is excluded, that is, the illumination element image, into the subelement images. As described above with reference to FIG. 4, a shadow element image and a shading element image may be divided from the color image based on a result of comparing an illumination element change rate between neighboring pixels to a normal vector change rate between the neighboring pixels.

In operation 540, the image processor estimates a direction of light or a position of at least one light source of the color image using the shadow element image. Also, the image processor may analyze an effect of an illumination based on the position of the light source estimated for each pixel in at least one area.

In operation 550, the image processor refines a depth image corresponding to the color image using the shading element image. Because the shading element from which the shadow element is divided and excluded is used, the depth image may be accurately refined.

In operation 560, the image processor performs rendering based on the effect of the illumination, the position of the light source estimated in operation 540, and the depth image refined in operation 550. The rendering may be performed iteratively for rendering consecutive images.

Thus, the proposed image processing method may obtain a plurality of subelement images by dividing the illumination element image into the subelement images, such as the shadow element image and the shading element image, and use the subelement images for an additional analysis and refinement to enhance a rendering quality.

The image processing apparatus 100, the rendering element analyzer 110, the illumination estimator 120, the depth refiner 130, and the renderer 140 in FIG. 1 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus comprising:
a first processor configured to obtain, from a color image, an illumination element image and an albedo element image corresponding to the color image; and
a second processor configured to divide the illumination element image into subelement images each corresponding to the color image, based on a determined normal vector change rate between neighboring pixels in at least one area of the color image.

2. The apparatus of claim 1, further comprising a memory configured to store instructions;
wherein the first processor is further configured to execute the instructions to obtain, from the color image, the illumination element image and the albedo element image corresponding to the color image; and
wherein the second processor is further configured to execute the instructions to divide the illumination element image into the subelement images each corresponding to the color image.

3. The apparatus of claim 2, wherein the second processor is further configured to divide the illumination element image into the subelement images using a depth image corresponding to the color image.

4. The apparatus of claim 3, wherein the second processor is further configured to calculate a normal vector corresponding to each pixel in the at least one area of the color image using the depth image for the dividing.

5. The apparatus of claim 4, wherein the second processor is further configured to divide the illumination element image into the subelement images based on comparing an illumination element change rate between the neighboring pixels to the normal vector change rate between the neighboring pixels.

6. The apparatus of claim 5, wherein the second processor is further configured to divide an illumination element change between the neighboring pixels into a shading element and a shadow element based on a degree of correlation between the illumination element change rate between the neighboring pixels and the normal vector change rate between the neighboring pixels.

7. The apparatus of claim 4, wherein the second processor is further configured to calculate a spherical harmonic function indicating a corresponding relationship between the normal vector and a shading element from an illumination element change between the neighboring pixels, and to divide the illumination element change between the neighboring pixels into the shading element and a shadow element based on a degree of correlation between the illumination element change and the spherical harmonic function.

8. The apparatus of claim 2, wherein the subelement images include any one or combination of a shading element image, a shadow element image, a highlight element image, and a specular element image.

9. The apparatus of claim 8, further comprising:
a third processor configured to estimate a direction of light or a position of at least one light source of the color image using the shadow element image.

10. The apparatus of claim 8, further comprising:
a fourth processor configured to refine a depth image corresponding to the color image using the shading element image.

11. An image processing apparatus comprising:
a first processor configured to obtain, from a color image, an illumination element image and an albedo element image corresponding to the color image; and
a second processor configured to calculate a normal vector corresponding to each pixel of the illumination element image using a depth image corresponding to the color image, cluster the illumination element image to at least one pixel group based on a normal vector change rate between neighboring pixels in the illumination element image, and to divide the illumination element image into subelement images based on comparing an illumination element change rate between neighboring pixels in the at least one pixel group to a normal vector change rate of the pixel group.

12. The apparatus of claim 11, further comprising a memory configured to store instructions;
wherein the first processor is further configured to execute the instructions to obtain, from the color image, the illumination element image and the albedo element image corresponding to the color image; and wherein the second processor is further configured to execute the instructions to calculate the normal vector corresponding to each pixel of the illumination element image using the depth image corresponding to the color image, cluster the illumination element image to at least one pixel group based on the normal vector change rate between neighboring pixels in the illumination element image, and to divide the illumination element image into subelement images based on the result of comparing the illumination element change rate between neighboring pixels in the at least one pixel group to the normal vector change rate of the pixel group.

13. The apparatus of claim 12, wherein the second processor is further configured to divide an illumination element change into a shading element and a shadow element based on a degree of correlation between the illumination element change rate between the neighboring pixels and the normal vector change rate of the pixel group.

14. The apparatus of claim 12, wherein the second processor is further configured to calculate a spherical harmonic function indicating a corresponding relationship between the normal vector and a shading element from an illumination element change between the neighboring pixels and to divide the illumination element change between the neighboring pixels into the shading element and a shadow element based on a degree of correlation between the illumination element change and the spherical harmonic function.

15. The apparatus of claim 12, wherein the subelement images include any one or combination of a shading element image, a shadow element image, a highlight element image, and a specular element image.

16. An image processing method comprising:
  obtaining, from a color image, an illumination element image and an albedo element image corresponding to the color image; and
  dividing the illumination element image into subelement images each corresponding to the color image, based on a determined normal vector change rate between neighboring pixels in at least one area of the color image.

17. The method of claim 16, wherein the dividing of the illumination element image comprises:
  calculating a normal vector corresponding to each pixel in the at least one area of the color image using a depth image corresponding to the color image for determining the normal vector change rate between the neighboring pixels in the at least one area.

18. The method of claim 17, wherein the dividing of the illumination element image comprises dividing an illumination element change between the neighboring pixels into a shading element and a shadow element based on a degree of correlation between an illumination element change rate between the neighboring pixels and the normal vector change rate between the neighboring pixels.

19. The method of claim 17, wherein the dividing of the illumination element image comprises:
  calculating a spherical harmonic function indicating a corresponding relationship between the normal vector and a shading element from an illumination element change between the neighboring pixels; and
  dividing the illumination element change between the neighboring pixels into the shading element and a shadow element based on a degree of correlation between the illumination element change and the spherical harmonic function.

20. A non-transitory computer-readable medium storing instructions that, when executed by one or more processors, cause the one or more processors to perform the image processing method of claim 16.

* * * * *